United States Patent Office 3,728,296
Patented Apr. 17, 1973

3,728,296
STABLE SOLUTIONS OF POLYGLUTAMIC ACID DERIVATIVES
Yasuo Fujimoto and Masayuki Teranishi, Tokyo, Japan, assignors to Kyowa Hakko Kogyo Co., Ltd., Tokyo, Japan
No Drawing. Filed Jan. 27, 1971, Ser. No. 110,260
Claims priority, application Japan, Feb. 10, 1970, 45/11,123
Int. Cl. C08g 51/30, 51/34
U.S. Cl. 260—30.4 N                22 Claims

ABSTRACT OF THE DISCLOSURE

Stable solutions of polyglutamic acid derivatives, useful for forming films or artificial leathers, are produced by adding a polyether polyol or an alkylenediamine polyether polyol to an inert organic solvent solution of a polymer of an N-carboxylic acid anhydride of a glutamic acid γ-ester.

---

This invention relates to stable solutions of polyglutamic acid derivatives. More particularly, it relates to a method for stabilizing solutions of polyglutamic acid derivatives to prevent a change with the lapse of time in the viscosity of the solution. Even more particularly, the invention relates to solutions of polyglutamic acid derivatives (hereinafter referred to as PG solutions) having a stabilized viscosity, obtained by adding certain polyether polyols thereto.

It is known that, when PG itself is made into a film or is coated onto a base cloth such as a woven fabric or a non-woven fabric, the moisture permeability, touch, feeling, etc. characteristics are similar to the properties of natural leather. Therefore, polyglutamic acid derivatives are materials with excellent and desirable properties.

In order to prepare such films or leathers, a wet method as well as a dry method comprising coating a PG solution onto the cloth and then drying the solvent to form a film or a leather are generally employed in the art. In either method, it is necessary that the PG solution be a homogeneous solution so as to form a film of high quality, that is, a film having a smooth surface and a good clarity as well as a good resemblance to the natural leather peculiar to the particular polyamino acid. Usually, when the PG solution has a lower molecular weight of 50,000 or less and a lower concentration of 5% by weight or less, any change with the lapse of time in the viscosity of the PG solution is generally small. However, when the PG solution contains polymers having a higher molecular weight of 50,000 or more and a higher concentration of 5% by weight or more, the change with the lapse of time in the viscosity of the solution is quite remarkable. In an extreme case, the PG solution turns into a complete gel state in 1–2 days. Once the PG solution is gelatinized, it is very difficult to return the gel back to the solution having the original flowability. For example, it is difficult to obtain the PG solution of the original flowability merely by diluting the gelatinized solution. Accordingly, it has been almost impossible to use the once-gelatinized PG solution for producing a film, a leather or the like.

Accordingly, one of the objects of the present invention is to provide solutions of polyglutamic acid derivatives which overcome the disadvantages and deficiencies of the prior art.

Another object of the present invention is to provide stable solutions of polyglutamic acid derivatives which may be readily employed to produce various films, leathers and the like.

A further object of the invention is to provide solutions of polyglutamic acid derivatives of sufficient molecular weight and concentration which do not lose their viscosity with the lapse of time.

These and other objects and advantages of the present invention will become apparent to those skilled in the art from a consideration of the following specification and claims.

In accordance with the present invention, the present inventors have found that the addition of a polyether polyol to a solution of a polyglutamic acid derivative stabilizes the solution, thereby reducing the change with lapse of time in the viscosity of the solution. In particular, a polyether polyol or an alkylenediamine polyether polyol (hereinafter referred to merely as "polyether polyols") is added to a solution of a polyglutamic acid derivative having the following molecular structure:

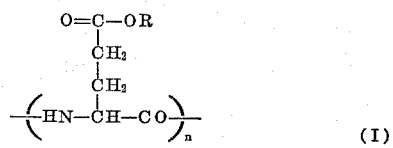

(I)

wherein $n$ is an integer such that the molecular weight of the polyglutamic acid derivative is at least 50,000 and R is a monovalent hydrocarbon residue having 1 to 10 carbon atoms (including residues substituted with halogen or nitro groups), the expression "hydrocarbon residue" herein designating a saturated or an unsaturated aliphatic, alicyclic or aromatic (including aliphatic group containing aromatic residue and aromatic group containing aliphatic residue) hydrocarbon group.

An appropriate amount of a polyether polyol is added with stirring to a PG solution prepared according to ordinary procedures and is mixed sufficiently so as to obtain a homogeneous solution. In this simple manner, the desired, stabilized PG solution can be obtained.

The PG solution used in the present invention is obtained in a conventional manner by polymerizing an N-carboxylic acid anhydride of an optically active or inactive glutamic acid-γ-ester having the following formula:

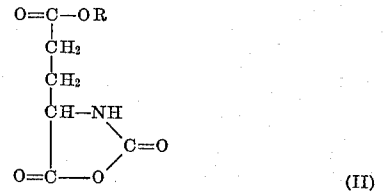

(II)

wherein R has the same meaning as defined hereinabove in connection with Formula I, in the presence of a suitable polymerization initiator in a suitable inert organic solvent.

Any of the monovalent hydrocarbon residues as defined above can be used as the ester group in said N-carboxylic acid anhydride. Typical examples thereof include methyl, ethyl, propyl (i- or n-), butyl (i-, n-, sec- or tert-), pentyl (including the various isomers thereof), hexyl (including the various isomers thereof), octyl (including the various isomers thereof), nonyl (including the various isomers thereof), decyl (including the various isomers thereof), cyclobutyl, cyclopentyl, cyclohexyl, cycloheptyl, benzyl, phenylethyl, phenyl or halogen- or nitro-substituents thereof. As suitable polymerization initiators, the well-known polymerization initiators used in the polymerization of N-carboxylic acid anhydrides of amino acids (for example, organic bases, organo-metallic compounds, etc.) can be used. Typical examples thereof include trimethylamine, triethylamine, tripropylamine (n- or i-), tributylamine (including the various isomers thereof), trihexylamine, tricyclohexylamine, 4,4′,4″ - trisdimethylaminotriphenylmethane, diethylamine, dipropylamine (including the various isomers thereof), dibutylamine (including the various isomers thereof), dihexylamine, dicyclohexylamine, morpholine, triethanolamine, N-methylmorpholine, N-methyl-2-pyrrolidone, alkyl lithium, dialkyl zinc, monoalkyl zinc, monoalkyl zinc alkoxide, sodium alkoxide, etc. As a suitable solvent, there may be mentioned, by way of example, the well-known polymerization solvents for N-carboxylic acid anhydrides of amino acids. Preferred solvents to be employed include halogenated hydrocarbons such as chloroform, ethylene dichloride, trichloroethylene, tetrachloroethylene, sym-tetrachloroethane, methylene chloride, etc.; N,N-disubstituted amides such as dialkyl formamide, dialkyl acetamide, N - alkyl - 2-pyrrolidone, etc.; cyclic ethers such as dioxane, tetrahydrofuran, etc.; alkyl esters of carboxylic acids such as ethyl acetate, etc. These solvents may be used either alone or in mixture. Aromatic hydrocarbons or halogenated aromatic hydrocarbons can be added thereto, for example, benzene, toluene, nitrobenzene, chlorobenzene, etc. The amount of polymerization solvent to be used is not particularly restricted, so long as the amount is sufficient to form a good polymerization system. Preferably, the amount of solvent employed is such so as to make the solids content in the solution about 1–50% by weight.

The polyether polyols to be used in accordance with the present invention include (1) the ring-cleaved polymers of cyclic ethers having 2–8 carbon atoms, including the oxides (for example, ethylene oxide, propylene oxide, oxetane, butylene oxide, tetrahydrofuran, tetrahydropyran, 1,2-epoxypentane, 2,3-epoxypentane, 1,2-epoxyhexane, 2,3-epoxyhexane, 1,2-epoxyheptane, 1,2-epoxyoctane, isobutylene epoxide, 2,5-dimethyltetrahydrofuran, 2,4-dimethyl - 3 - hydroxymethyltetrahydrofuran, dioxane, etc. or mixtures thereof), (2) mixtures of the ring cleaved polymers, (3) the products obtained by condensing one or more of these cyclic ethers with one or more diols (for example, ethylene glycol, propylene glycol, diethylene glycol, dipropylene glycol, tetramethylene glycol, 1,3-propandiol, butanediols, pentanediols, hexanediols, etc.), or triols (for example, trimethylol propane, trimethylol ethane, triethylol ethane, glycerine, butanetriols, hexanetriols, etc.), or polyols (pentaerythritol, pentaoxycyclohexane, sorbitol, mannitol, etc.) in the presence of a suitable catalyst or a suitable initiator (for example, trialkylamines such as trimethylamine, triethylamine, etc.; inorganic bases such as potassium hydroxide, etc.; halides such as boron trifluoride, etc.; or the like), or (4) the condensation products of one or more of said various diols, triols and polyols. Further, as the alkylenediamine polyether polyols to be employed, the products obtained by the addition reaction of any of said polyether polyols and alkylenediamines having 1–6 carbon atoms or the condensates of the alkylenediamines having 1–6 carbon atoms with said cyclic ethers having 2–8 carbon atoms or with the said mixtures thereof can be used. In general, the process for preparing the polyether polyols is disclosed, for example, in Saunders et al.: Chemistry and Technology of Polyurethanes, Part 1, Chemistry of High Polymers, vol. 16 (Interscience Publishers, 1962), pages 32–44.

The amount of polyether polyol to the added to the PG solutions in accordance with this invention can be selected, as desired, from a wide range, depending upon the particular type of polyether polyol employed. An excellent effect is usually obtained by adding a very small amount of the polyether polyol to the solution, preferably in a ratio of about 0.01–20% by weight based on the amount of polyglutamic acid derivative in the PG solution. The most preferred ratio of additive is 0.5–5% by weight. Not only can the stabilized PG solution obtained in accordance with this invention be preserved stably for a long period of time, but also when a film is prepared from the PG solution, a whitening phenomenon which is observed in the case when no polyether polyols are added, depending upon the conditions, can be prevented by adding said polyether polyols to the PG solution.

The following examples are given merely as illustrative of the present invention and are not to be considered as limiting. A synchronous motor-type, rotary viscometer (trade name: Vismetron, manufactured by Tokyo Keiki K.K.) was used to measure the viscosity of the PG solution, which showed the change with the lapse of time of the viscosity of the PG solution.

EXAMPLE 1

1.1 ml. of triethylamine was added to 570 g. of 1,2-dichloroethane, and 75.0 g. of the N-carboxylic acid anhydride of γ-methyl-L-glutamate was slowly added thereto, while keeping the temperature at 20°–25° C. After the addition, stirring was continued at that temperature for about 8 hours, whereby a PG solution was obtained. A portion of the thus-obtained solution was added to methanol dropwise to precipitate the polymer. After the polymer was dried, the intrinsic viscosity thereof was measured in a dichloroacetic acid solution and was found to be 1.50 (20° C.). The viscosity of the PG solution was 115,500 centipoises at 25° C. To 100 g. of the said PG solution was added 0.5 g. of polyoxyethyleneoxypropylene glycol (average molecular weight of polypropylene glycol-portion: 1500–1800, a fraction of polyethylene glycol-portion: 20%, hydroxyl value: 65), and the mixture was well stirred. The change with the lapse of time of the viscosity of the thus-obtained, stabilized PG solution is shown below (preserved at 25° C. in a tightly sealed state).

|  | Immediately after the preparation | After 1 month | After 2 months | After 6 months |
| --- | --- | --- | --- | --- |
| PG solution without addition of the stabilizer (cps.) | 115,500 | 145,400 | Gelatinized |  |
| PG solution with addition of the stabilizer (cps.) | 115,800 | 113,800 | 1 3,000 | 113,500 |

EXAMPLE 2

1.3 ml. of triethylamine was added to 570 g. of 1,2-dichloroethane, and 75.0 g. of the N-carboxylic acid anhydride of γ-methyl-L-glutamate was slowly added thereto, while keeping the temperature at 10° C. After the addition, stirring was continued at that temperature for about 10 hours. The viscosity of the thus-obtained PG solution was 36,000 cps. To 100 g. of the PG solution was added 0.1 g. of ethylenediaminepolyoxypropylene (molecular weight: 3,000, hydroxyl value: 500), and the mixture was well stirred. The change with the lapse of time of the viscosity of the thus-obtained, stabilized PG solution is shown below (preserved at 25° C. in a tightly sealed state).

|  | Immediately after the preparation | After 1 month | After 2 months | After 6 months |
| --- | --- | --- | --- | --- |
| PG solution without addition of the stabilizer (cps.) | 36,000 | 37,400 | 41,700 | 45,300 |
| PG solution with addition of the stabilizer (cps) | 35,600 | 35,400 | 35,200 | 35,500 |

EXAMPLE 3

2.2 ml. of tri-n-butylamine was added to 570 g. of chloroform and 260 g. of the N-carboxylic acid anhydride of γ-benzyl-D-glutamate was slowly added thereto, while keeping the temperature at 20°–25° C. After the addition, stirring was continued at that temperature for about 10 hours. The viscosity of the thus-obtained PG solution was 135,000 cps. To 100 g. of the PG solution was added 0.5 g. of polyoxypropylene glycol (average molecular weight: 1,000, hydroxyl value: 110), and the mixture was stirred to render the mixture sufficiently homogeneous. The change with the lapse of time of the viscosity of the thus-obtained, stabilized PG solution is shown below (preserved at 25° C. in a tightly sealed state).

|  | Immediately after the preparation | After 1 month | After 3 months |
|---|---|---|---|
| PG solution without addition of the stabilizer (cps.) | 135,000 | 172,600 | Gelatinized |
| PG solution with addition of the stabilizer (cps.) | 138,000 | 134,300 | 139,000 |

EXAMPLE 4

0.1 g. of ethylenediaminepolyoxyethyleneoxypropylene (average molecular weight of polypropylene glycol-portion: 1,500, a fraction of polyethylene glycol-portion: 20%, hydroxyl value: 70) was added to 100 g. of a solution of 15% poly-γ-n-butyl-D-glutamate in 1,2-dichloroethanetrichloroethylene (ratio by volume of 80:20) having a viscosity of 85,000 cps., and the mixture was well stirred. The change with the lapse of time of the viscosity of the thus-obtained, stabilized PG solution is given below (preserved at 25° C. in a tightly sealed state).

|  | Immediately after the preparation | After 1 month | After 3 months | After 6 months |
|---|---|---|---|---|
| PG solution without addition of the stabilizer (cps.) | 85,700 | 89,300 | 95,200 | 100,500 |
| PG solution with addition of the stabilizer (cps.) | 83,200 | 81,400 | 85,300 | 87,400 |

EXAMPLE 5

1.1 ml. of triethylamine was added to 600 g. of 1,2-dichloroethanetetrachloroethylene (ratio by volume of 70:30), and 250 g. of the N-carboxylic acid anhydride of γ-cyclohexyl-L-glutamate was slowly added thereto, while keeping the temperature at 10–15° C. After the addition, stirring was continued at that temperature for about 10 hours. The viscosity of the thus-obtained PG solution was 78,000 cps. To 100 g. of the PG solution was added 0.5 g. of the polyether polyol (molecular weight: 750, hydroxyl value: 225) obtained by the polyaddition of propylene oxide to trimethylol propane, and the mixture was sufficiently stirred to make it homogeneous.

The change with the lapse of time of the viscosity of the thus-obtained, stabilized PG solution is shown below:

|  | Immediately after the preparation | After 1 month | After 3 months | After 6 months |
|---|---|---|---|---|
| PG solution without addition of the stabilizer (cps.) | 78,000 | 85,400 | 89,300 | 97,000 |
| PG solution with addition of the stabilizer (cps.) | 78,200 | 78,100 | 82,100 | 85,000 |

The invention being thus described, it will be obvious that the same may be varied in many ways. Such variations are not to be regarded as a departure from the spirit and scope of the invention, and all such modifications as would be obvious to one skilled in the art are intended to be included herein.

We claim:
1. A stable solution of a polymer of a glutamic acid γ-ester comprising:
   (I) an inert organic solvent,
   (II) a polymer of a glutamic acid γ-ester having the following structure:

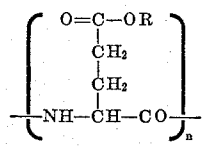

wherein n is an integer such that the molecular weight of said polymer is at least 50,000 and R is a hydro- carbon residue or a halogen- or nitro-substituted derivative thereof having from 1 to 10 carbon atoms, the concentration of said polymer in said solution being 1 to 50% by weight, and
   (III) a polyol having a molecular weight of from 750 to 3,000 which is selected from the group consisting of:
      (1) a polyether polyol selected from the group consisting of:
         (a) at least one ring cleaved polymer of a cyclic ether having from 2 to 8 carbon atoms,
         (b) mixtures of said ring-cleaved polymers,
         (c) condensation products of said cyclic ethers with a diol, triol, or higher polyol,
         (d) condensation products of at least one diol, triol or higher polyol,
      (2) an alkylenediamine polyether polyol selected from the group consisting of:
         (a) products obtained by the addition reaction of a polyether polyol with an alkylenediamine having from 1 to 6 carbon atoms, and
         (b) condensates of an alkylene diamine having from 1 to 6 carbon atoms with at least one cyclic ether having from 2 to 8 carbon atoms,
      said polyol being added to said solution in a ratio of 0.01 to 20% by weight based on the amount of said polymer (III).

2. A stabilized solution in accordance with claim 1, wherein from 0.5 to 5% by weight of said polyol based on the amount of said polymer (II) is present in said solution.

3. A stabilized solution in accordance with claim 1, wherein said diol is an alkylene glycol having from 2 to 6 carbon atoms or a dialkylene glycol having from 4 to 6 carbon atoms, said triol is an alkanetriol having from 3 to 8 carbon atoms, and said higher polyol is an alkanepolyol having from 5 to 6 carbon atoms with from 4 to 6 hydroxyl groups or pentaoxycyclohexane.

4. A stabilized solution in accordance with claim 1, wherein the polyether polyol reacted with an alkylenediamine having from 1 to 6 carbon atoms is selected from the group consisting of at least one ring-cleaved polymer of a cyclic ether having from 2 to 8 carbon atoms, mixtures of said ring-cleaved polymers, condensation products of said cyclic ethers with at least one polyol compound selected from the group consisting of an alkylene glycol having from 2 to 6 carbon atoms, a dialkylene glycol having from 4 to 6 carbon atoms, an alkanetriol having from 3 to 8 carbon atoms, an alkanepolyol having from 5 to 6 carbon atoms with from 4 to 6 hydroxyl groups and pentaoxycyclohexane, and condensation products of at least one of said polyol compounds.

5. A stabilized solution in accordance with claim 1, wherein said polyol is polyoxyethyleneoxypropylene glycol.

6. A stabilized solution in accordance with claim 1, wherein said polyol is ethylenediaminepolyoxypropylene.

7. A stabilized solution in accordance with claim 1, wherein said polyol is polyoxypropylene glycol.

8. A stabilzed solution in accordance with claim 1, wherein said polyol is ethylenediaminepolyoxyethyleneoxypropylene.

9. A stabilzed solution in accordance with claim 1, wherein said polyol is the reaction product of propylene oxide and trimethylolpropane.

10. A stabilized solution in accordance with claim 1, wherein the polymer (II) is a polymer of an N-carboxylic acid anhydride of a γ-methyl-L-glutamate.

11. A stabilized solution in accordance with claim 1, wherein the polymer (II) is a polymer of an N-carboxylic acid anhydride of a γ-benzyl-D-glutamate.

12. A stabilized solution in accordance with claim 1, wherein the polymer (II) is a polymer of an N-carboxylic acid anhydride of a γ-butyl-D-glutamate.

13. A stabilized solution in accordance with claim 1, wherein the polymer (II) is a polymer of an N-carboxylic acid anhydride of a γ-cyclohexyl-L-glutamate.

14. A stable solution according to claim 1, wherein said polymer of a glutamic acid 2-ester is a polymer of an N-carboxylic acid anhydride of a glutamic acid γ-ester.

15. A stable solution according to claim 14, wherein the N-carboxylic acid anhydride of a glutamic acid γ-ester has the following formula:

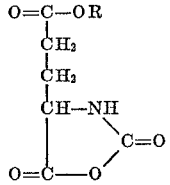

wherein R is as defined in claim 1.

16. A stable solution according to claim 1, wherein the hydrocarbon residue is a saturated or an unsaturated aliphatic alicyclic, or aromatic hydrocarbon group.

17. A method for stabilizing an inert organic solvent solution of a polymer of a glutamic acid γ-ester which comprises forming a solution of a polymer of a glutamic acid γ-ester having the following structure:

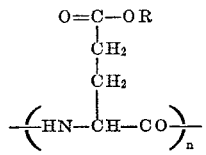

wherein n is an integer such that the molecular weight of the polymer is at least 50,000 and R is a hydrocarbon residue or a halogen- or nitro-substituted derivative thereof having from 1 to 10 carbon atoms in an inert solvent, the concentration of said polymer in said solution being 1 to 50% by weight, and adding to said solution 0.01 to 20% by weight of a polyol having a molecular weight of from 750 to 3,000 which is selected from the group consisting of:

(1) a polyether polyol selected from the group consisting of:
   (a) at least one ring-cleaved polymer of a cyclic ether having from 2 to 8 carbon atoms,
   (b) mixtures of said ring-cleaved polymers,
   (c) condensation products of said cyclic ethers with a diol, triol or higher polyol,
   (d) condensation products of at least one diol, triol or higher polyol, and (2) an alkylenediamine polyether polyol selected from the group consisting of:
   (a) products obtained by the addition reaction of a polyether polyol and an alkylenediamine having from 1 to 6 carbon atoms, and
   (b) condensates of an alkylene diamine having from 1 to 6 carbon atoms with at least one cyclic ether having from 2 to 8 carbon atoms, based on the amount of said polymer of a glutamic acid γ-ester.

18. A method according to claim 17, wherein said polymer of a glutamic acid γ-ester is a polymer of an N-carboxylic acid anhydride of a glutamic acid γ-ester.

19. A method according to claim 18, wherein the N-carboxylic acid anhydride of a glutamic acid γ-ester has the following formula:

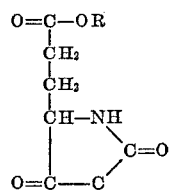

wherein R is as defined in claim 17.

20. A method according to claim 19, wherein R is a saturated or unsaturated aliphatic, alicyclic, or aromatic hydrocarbon group.

21. A method according to claim 17, wherein the diol is an alkylene glycol having from 2 to 6 carbon atoms or a dialkylene glycol having from 4 to 6 carbon atoms, said triol is an alkane-triol having from 3 to 8 carbon atoms, and said higher polyol is an alkane-polyol having from 5 to 6 carbon atoms with from 4 to 6 hydroxyl groups or pentaoxycyclohexane.

22. A method according to claim 17, wherein the polyether polyol reacted with an alkylenediamine having 1 to 6 carbon atoms is selected from the group consisting of at least one ring-cleaved polymer of a cyclic ether having from 2 to 8 carbon atoms, mixtures of said ring-cleaved polymers, condensation products of said cyclic ethers with at least one polyol compound selected from the group consisting of an alkylene glycol having from 2 to 6 carbon atoms, a dialkylene glycol having from 4 to 6 carbon atoms, an alkanetriol having from 3 to 8 carbon atoms, an alkanepolyol having from 5 to 6 carbon atoms, with from 4 to 6 hydroxyl groups and pentaoxycyclohexane, and condensation products of at least one of said polyol compounds.

References Cited
UNITED STATES PATENTS

| | | |
|---|---|---|
| 3,371,069 | 2/1968 | Miyamae et al. _____ 260—78 A |
| 3,557,272 | 1/1971 | Takagi et al. ____ 260—78 AX |
| 3,634,544 | 1/1972 | Takeda et al. _____ 260—858 |

LEWIS JACOBS, Primary Examiner

U.S. Cl. X.R.

260—31.2 N, 32.6 N, 33.8 R, 45.7 R